(12) United States Patent
Ali et al.

(10) Patent No.: US 10,105,689 B2
(45) Date of Patent: Oct. 23, 2018

(54) HEAT GENERATING CATALYST FOR HYDROCARBONS CRACKING

(71) Applicant: Saudi Arabian Oil Company, Dhahran (SA)

(72) Inventors: Ola S. Ali, Thuwal (SA); Hussain Al Yami, Thuwal (SA); Mark P. Kaminsky, Friendwood, TX (US); Sohel Shaikh, Dhahran (SA); Wei Xu, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 15/584,585

(22) Filed: May 2, 2017

(65) Prior Publication Data

US 2017/0326534 A1    Nov. 16, 2017

Related U.S. Application Data

(60) Provisional application No. 62/335,213, filed on May 12, 2016.

(51) Int. Cl.

| | | |
|---|---|---|
| *B01J 29/06* | (2006.01) | |
| *B01J 29/18* | (2006.01) | |
| *B01J 29/40* | (2006.01) | |
| *B01J 29/42* | (2006.01) | |
| *B01J 37/02* | (2006.01) | |
| *B01J 37/03* | (2006.01) | |
| *B01J 37/14* | (2006.01) | |
| *B01J 29/20* | (2006.01) | |
| *B01J 29/24* | (2006.01) | |
| *B01J 29/26* | (2006.01) | |
| *C10G 11/04* | (2006.01) | |
| *C10G 11/05* | (2006.01) | |
| *C10G 11/18* | (2006.01) | |
| *C10G 11/16* | (2006.01) | |
| *B01J 37/28* | (2006.01) | |
| *B01J 35/00* | (2006.01) | |
| *B01J 29/46* | (2006.01) | |
| *B01J 29/48* | (2006.01) | |
| *B01J 38/12* | (2006.01) | |
| *B01J 29/90* | (2006.01) | |
| *B01J 35/02* | (2006.01) | |

(52) U.S. Cl.
CPC ............. *B01J 29/18* (2013.01); *B01J 29/185* (2013.01); *B01J 29/20* (2013.01); *B01J 29/24* (2013.01); *B01J 29/26* (2013.01); *B01J 29/40* (2013.01); *B01J 29/405* (2013.01); *B01J 29/42* (2013.01); *B01J 29/46* (2013.01); *B01J 29/48* (2013.01); *B01J 35/0006* (2013.01); *B01J 37/0201* (2013.01); *B01J 37/0209* (2013.01); *B01J 37/035* (2013.01); *B01J 37/14* (2013.01); *B01J 37/28* (2013.01); *C10G 11/04* (2013.01); *C10G 11/05* (2013.01); *C10G 11/16* (2013.01); *C10G 11/18* (2013.01); *B01J 29/90* (2013.01); *B01J 35/002* (2013.01); *B01J 35/023* (2013.01); *B01J 38/12* (2013.01); *B01J 2229/186* (2013.01); *C10G 2400/20* (2013.01); *C10G 2400/22* (2013.01)

(58) Field of Classification Search
CPC . B01J 29/40; B01J 29/405; B01J 29/42; B01J 29/46; B01J 29/48; B01J 2229/186; B01J 35/0006; B01J 37/0201; B01J 37/0209; B01J 37/035; B01J 37/14
USPC ......................................... 502/60, 74, 76, 77
See application file for complete search history.

(56) References Cited

U.S. PATENT DOCUMENTS

| | | | |
|---|---|---|---|
| 2,476,729 A | | 7/1949 | Helmers |
| 3,013,985 A | * | 12/1961 | Breck .................... B01J 29/064 252/181.6 |
| 3,346,328 A | * | 10/1967 | Sergeys ............... B01D 53/944 423/213.2 |
| 4,835,127 A | | 5/1989 | Eastman et al. |
| 5,041,272 A | | 8/1991 | Tamura et al. |

(Continued)

FOREIGN PATENT DOCUMENTS

| | | |
|---|---|---|
| CN | 102531821 A | 7/2012 |
| CN | 104194818 A | 12/2014 |

(Continued)

OTHER PUBLICATIONS

Chang et al., "An improved catalytic cracking of n-hexane via methanol coupling reaction over HZSM-5 zeolite catalysts", Catalysis Letters vol. 106, Nos. 3-4, pp. 171-176, Feb. 2006.

(Continued)

*Primary Examiner* — Elizabeth D Wood
(74) *Attorney, Agent, or Firm* — Dinsmore & Shohl LLP

(57) ABSTRACT

A method of making a heat generating catalyst for hydrocarbon cracking. The method includes providing at least one mordenite framework-inverted (MFI) zeolite having a Si/Al molar ratio of 15 or greater and providing at least one metal oxide precursor. Further, the at least one metal oxide precursor is dispersed within a microstructure of the MFI zeolite catalyst. The method additionally includes calcining the heat generating material with the at least one metal oxide precursor dispersed within the microstructure of the MFI zeolite catalyst to form at least one metal oxide in situ. The heat generating catalyst includes at least one MFI zeolite and at least one metal oxide in a ratio between 50:50 and 95:5. Additionally, an associated method of using the heat generating catalyst in a hydrocarbon cracking process is provided.

11 Claims, 4 Drawing Sheets

(56) References Cited

U.S. PATENT DOCUMENTS

| | | | |
|---|---|---|---|
| 5,059,738 A | 10/1991 | Beech, Jr. et al. | |
| 5,110,777 A * | 5/1992 | Kamiyama | B01D 53/9418 502/68 |
| 5,318,692 A | 6/1994 | Eberly, Jr. et al. | |
| 5,318,696 A | 6/1994 | Kowalski | |
| 5,527,979 A | 6/1996 | Agaskar et al. | |
| 5,530,171 A | 6/1996 | Agaskar et al. | |
| 5,558,766 A * | 9/1996 | Prada | B01J 21/063 208/111.3 |
| 5,583,081 A | 12/1996 | Price et al. | |
| 5,968,466 A * | 10/1999 | Kharas | B01D 53/945 423/213.2 |
| 5,997,728 A | 12/1999 | Adewuyi et al. | |
| 6,046,128 A * | 4/2000 | Kisen | B01J 29/40 423/239.2 |
| 6,579,347 B1 * | 6/2003 | Wakita | B01D 53/04 95/135 |
| 7,122,492 B2 | 10/2006 | Ou et al. | |
| 7,122,493 B2 | 10/2006 | Ou et al. | |
| 7,122,494 B2 | 10/2006 | Ou et al. | |
| 7,122,495 B2 | 10/2006 | Ou et al. | |
| 7,125,817 B2 | 10/2006 | Ou et al. | |
| 7,145,051 B2 | 12/2006 | Ou et al. | |
| 7,622,623 B2 | 11/2009 | Fridman et al. | |
| 7,973,207 B2 | 7/2011 | Fridman et al. | |
| 8,188,328 B2 | 5/2012 | Fridman et al. | |
| 2003/0181325 A1 | 9/2003 | Ou et al. | |
| 2004/0152585 A1 | 8/2004 | Ou et al. | |
| 2004/0152586 A1 | 8/2004 | Ou et al. | |
| 2005/0020867 A1 | 1/2005 | Xie et al. | |
| 2006/0014630 A1 | 1/2006 | Matsumoto et al. | |
| 2006/0073960 A1 | 4/2006 | Matsumoto et al. | |
| 2009/0134065 A1 | 5/2009 | Cheng et al. | |
| 2011/0251448 A1 | 10/2011 | Fridman et al. | |
| 2013/0060070 A1 | 3/2013 | Huber et al. | |
| 2014/0221707 A1 | 8/2014 | Bories et al. | |
| 2014/0357912 A1 | 12/2014 | Mandal et al. | |
| 2015/0165427 A1 | 6/2015 | Awayssa et al. | |

FOREIGN PATENT DOCUMENTS

| | | |
|---|---|---|
| EP | 0921175 A1 | 6/1999 |
| GB | 315991 A | 7/1929 |
| WO | 2012088852 A1 | 7/2012 |

OTHER PUBLICATIONS

Du et al., "Porosity of microporous zeolites A, X and ZSM-5 studied by small angle X-ray scattering and nitrogen adsorption", Journal of Physics and Chemistry of Solids, vol. 68, pp. 1692-1699, 2007.

Gong et al., "Coupling Conversion of Methanol and C4 Hydrocarbon to Propylene on La-Modified HZSM-5 Zeolite Catalysts", American Chemical Society, L&EC Research, vol. 51, pp. 13589-13598, 2012.

Jinlai et al., "Effects of Metal Oxide in ZSM-5 Zeolite on Its Catalytic Performance in FCC Process", China Petroleum Processing and Petrochemical Technology, vol. 13, No. 2, pp. 43-46, Jun. 30, 2011.

Late et al., "Selective combustion of hydrogen in the presence of hydrocarbons Part 2. Metal Oxide based catalysts", Applied Catalysis A: General, vol. 262, pp. 63-68, 2004.

Lucke et al., "CMHC: coupled methanol hydrocarbon cracking Formation of lower olefins from methanol and hydrocarbons over modified zeolites", Microporous and Mesoporous Materials, vol. 29, pp. 145-157, 1999.

Martin et al., "Effect of Ageing of H-ZSM-5 Zeolites During Coupled Methanol Hydrocarbon Cracking (CMHC)", React. Kinet. Catal. Lett., vol. 44, No. 1, pp. 237-242, 1991.

Mier et al., "Catalyst discrimination for olefin production by coupled methanol/n-butane cracking", Applied Catalysis A: General, vol. 383, pp. 202-210, 2010.

Rahimi et al., "Catalytic cracking of hydrocarbons over modified ZSM-5 zeolites to produce light olefins: A review", Applied Catalysis A: General, vol. 398, pp. 1-17, 2011.

Tsikoyiannis et al., "Metal Oxides as Selective Hydrogen Combusion (SHC) Catalysts and their Potential in Light Paraffin Dehydrogenation", Journal of Catalysis, vol. 184, pp. 77-86, 1999.

Wang et al., "Highly Efficient P-Modified HZSM-5 Catalyst for the Coupling Transformation of Methanol and 1-Butene to Propene", Energy & Fuels, vol. 24, pp. 758-763, 2010.

Yan et al., "Mixed Naphtha/Methanol Feed Used in Thermal Catalytic/Steam Cracking (TCSC) Process for the Production of Propylene and Ethylene", Catalysis Letters, vol. 141, pp. 691-698, 2011.

Yan et al., "Catalytic Compatibility of Methanol with Petroleum Naphtha in Mixed Feeds Used in the Thermal-Catalytic/Steam-Cracking (TCSC) Process for the Production of Propylene and Ethylene", Catalysis Letters, vol. 142, pp. 60-70, 2012.

Yoshimura et al., "Catalytic cracking of naphtha to light olefins", Catalysis Surveys from Japan, vol. 4, No. 2, pp. 157-167, 2000.

Zaidi et al., "Catalytic Activity of Copper Oxide Impregnated HZSM-5 in Methanol Conversion to Liquid Hydrocarbons", Canadian Journal of Chemical Engineering, vol. 83, pp. 970-977, Dec. 2005.

Search Report & Written Opinion pertaining to International Application No. PCT/US2017/030720 dated Jul. 12, 2017.

Search Report & Written Opinion pertaining to International Application No. PCT/US2017/032165 dated Jul. 28, 2017.

U.S. Non-Final Office Action dated Jan. 10, 2018 pertaining to U.S. Appl. No. 15/584,598.

U.S. Non-Final Office Action dated Mar. 8, 2018 pertaining to U.S. Appl. No. 15/720,185.

* cited by examiner

HEAT GENERATING CATALYST FOR HYDROCARBONS CRACKING

CROSS-REFERENCE TO RELATED APPLICATIONS

This application claims the benefit of U.S. Provisional Application Ser. No. 62/335,213 filed May 12, 2016, incorporated herein by reference.

BACKGROUND

Field

Embodiments of the present disclosure generally relate to a heat generating catalyst for hydrocarbon cracking, and specifically relate to a method of making a heat generating catalyst and a method of using the heat generating catalyst in a hydrocarbon cracking process.

Technical Background

Current commercial technologies for production of light olefins, such as ethylene and propylene, include thermal cracking or steam cracking as well as catalytic cracking. Steam cracking is a non-catalytic process that operates at elevated reaction temperatures of approximately 850° C. and requires steam dilution to control selectivity and maintain acceptable loop life. It is by far the most energy consuming process in the chemical industry. It was found that the pyrolysis section of a naphtha steam cracker alone consumes approximately 65% of the total process energy and accounts for approximately 75% of the total energy loss. Moreover, the process is extremely sensitive to feed variations and raises several environmental concerns. It is not suitable for meeting the anticipated growing demand of propylene as it produces ethylene as the primary product and it allows very little control over propylene to ethylene (P/E) ratio. Conversely, catalytic cracking, particularly, fluidized catalytic cracking (FCC) with solid acid catalysts produces products with relatively higher P/E ratios and operates at lower temperatures of 500-650° C. In the FCC process, the catalyst is suspended in a rising flow of feed hydrocarbons in a fluidized bed. Pre-heated hydrocarbon feed is sprayed into the base of the frustum/riser via feed nozzles where it contacts hot fluidized catalysts at 500-650° C. The hot catalysts vaporize the feed and catalyze the cracking reactions to break down the high molecular weight molecules into lighter components including liquid petroleum gas (LPG), gasoline, and diesel. The "spent" catalyst then flows into a fluidized-bed regenerator where air or in some cases air plus oxygen is used to burn off the coke to restore catalyst activity and also provide the necessary heat for the next reaction cycle. The "regenerated" catalyst then flows to the base of the riser, repeating the cycle.

The hydrocarbon cracking industry has invested significant efforts to maximize the energy efficiency of endothermic hydrocarbon conversion processes, especially cracking, without compromising yields and conversion. For example, FCC is ideally thermo-neutral where coke combustion in the regenerator fuels the endothermic cracking reaction. In reality, however, this heat generated from coke combustions is often insufficient, especially for lighter feeds with high hydrogen/carbon (H/C) ratios. Several techniques have previously been employed to overcome energy deficiencies such as injecting excess air to promote complete combustion. However, injecting excess air significantly increases side reactions as well as operating and capital costs. Alternatively, injection of a calculated amount of an aromatic heavy fuel, known as torch oil, to the regenerator section has been attempted to provide additional thermal energy. This method, while effective, usually results in the formation of non-oxidized cracked products. The non-oxidized crack products may cause formation of hot spots in the catalyst bed, which, in the presence of steam, could cause deactivation and local permanent damages to the catalyst bed.

SUMMARY

In view of the provided background, an ongoing need exists for the development of efficient and economical routes to crack crude oil to yield high demand petrochemical building blocks including ethylene, propylene, butenes, benzene, toluene and xylene as well as other hydrocarbons such as gasoline, atmospheric gas oil (ago), and vacuum gas oil (vgo).

Embodiments of the present disclosure are directed to methods of making and using a heat generating catalyst in a hydrocarbon cracking process to fuel the energy requirements of endothermic hydrocarbon cracking. The methods of the present disclosure have industrial applicability, specifically in the oil and gas industries due to the high energy costs traditionally required for hydrocarbon cracking. Without being limited to theory, the heat generating catalysts of the present disclosure are added to help the hydrocarbon cracking process become energy neutral or approach energy neutrality, thereby reducing the overall energy costs associated with hydrocarbon cracking.

According to one embodiment, a method of making a heat generating catalyst for hydrocarbon cracking is provided. The method includes providing at least one mordenite framework-inverted (MFI) zeolite catalyst having a Si/Al molar ratio of 15 or greater and providing at least one metal oxide precursor. Further, the method includes dispersing the at least one metal oxide precursor within a microstructure of the MFI zeolite catalyst. Subsequently, the method includes calcining the metal oxide precursor impregnated MFI zeolite catalyst to form a heat generating catalyst. The ratio of MFI zeolite catalyst to metal oxide is in the range of 50:50 to 95:5 on a weight basis. The catalyst could be further modified with binders, clays, dispersants and other additives.

According to another embodiment, a method of using a heat generating catalyst in a hydrocarbon cracking process is provided. The method includes providing a catalyst bed reactor which includes a catalyst bed of the heat generating catalyst disposed in the catalyst bed reactor. The heat generating material is formed from at least one mordenite framework-inverted (MFI) zeolite catalyst having a Si/Al molar ratio of 15 or greater and at least one metal oxide dispersed within a microstructure of the MFI zeolite catalyst. The method further includes introducing a hydrocarbon feed to the catalyst bed reactor and cracking the hydrocarbon feed to produce a cracking product. According to at least one embodiment, the cracking product includes light $C_1$-$C_4$ hydrocarbons.

Additional features and advantages of the described embodiments will be set forth in the detailed description which follows, and in part will be readily apparent to those skilled in the art from that description or recognized by practicing the described embodiments, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various described embodiments, and together with the description serve to explain the principles and operations of the claimed subject matter.

DETAILED DESCRIPTION

Figure 1:
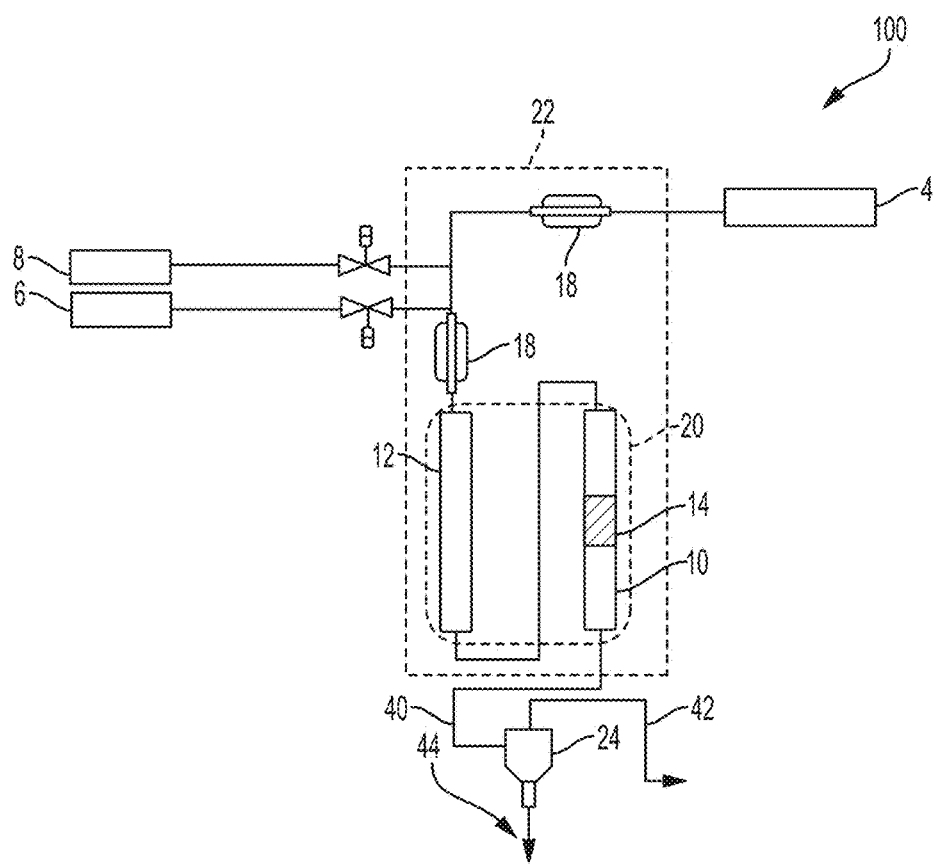
FIG. 1 is a schematic illustration of a lab-scale reactor system for operation in accordance with one or more embodiments of the present disclosure.

Reference will now be made in detail to embodiments for methods of making a heat generating catalyst for hydrocarbon cracking and the improved cracking of a hydrocarbon feed using the heat generating catalysts of the present disclosure. As stated previously, hydrocarbon cracking is an endothermic process. By combining a cracking catalyst with a heat generating metal oxide, the traditionally endothermic hydrocarbon cracking process can become thermally neutral or approach thermal neutrality. Specifically, the metal oxides dispersed throughout the cracking catalyst generate exothermic heat through a reduction reaction in a reactor when included in the hydrocarbon cracking processes of the present disclosure. This exothermic heat may provide additional heat needed for the endothermic hydrocarbon cracking process. Additionally, an oxidation reaction in a regenerator when the reduced catalyst is exposed to oxidizing conditions generates additional heat. The heat generated in the regenerator from the oxidation reaction increases the temperature of the heat generating catalyst which in turn increases conversion of the hydrocarbon feed when the heat generating catalyst is recycled back into the reactor.

A method of making a heat generating catalyst for hydrocarbon cracking is provided. A cracking catalyst and at least one metal oxide precursor are combined together. Specifically, the at least one metal oxide precursor is dispersed within a microstructure of the cracking catalyst. With the at least one metal oxide precursor dispersed within the microstructure of the cracking catalyst, the heat generating catalyst is calcined to convert the at least one metal oxide precursor into at least one metal oxide.

In at least one embodiment, The ratio of MFI zeolite catalyst to metal oxide in the heat generating catalyst is between 50:50 and 95:5 on a weight basis. There is a trade-off between catalyst and metal oxide percentages. Specifically, increases in the weight percentage of metal oxide provide additional heat generating metal oxide during the reduction reaction allowing for hotter or longer sustained heat generation. However, an increase in metal oxide percentage may result in reduced catalyst activity of the MFI zeolite catalyst. In various further embodiments, the ratio of MFI zeolite catalyst to metal oxide in the heat generating catalyst is between 70:30 and 85:15 on a weight basis, between 70:30 and 80:20 on a weight basis, and between 75:25 and 85:15 on a weight basis. In at least one embodiment, the ratio of MFI zeolite catalyst to metal oxide in the heat generating catalyst is between 79:21 and 81:19 on a weight basis. Without wishing to be bound by theory, it is believed that the metal oxide may modify the acid sites on the MFI zeolite in a way that may affect the cracking activity in addition to generating heat. The modification of the acid sites may ultimately increase or decrease the catalyst activity of the MFI zeolite catalyst and adjust the selectivity of resultant species on the product stream. The modification of acid sites is dependent upon the metal oxide, the MFI zeolite, and the quantities of each utilized in the heat generating catalyst.

Various components are contemplated for the cracking catalyst. In one or more embodiments, the cracking catalyst may include an aluminosilicate zeolite, a silicate (for example, silicalite), or a titanosilicate. In further embodiments, the solid acid cracking catalyst is an aluminosilicate zeolite having a Mordenite Framework Inverted (MFI) structure. For example and not by way of limitation, the MFI zeolite catalyst may be a ZSM-5 catalyst. In a further embodiment, the ZSM-5 catalyst may be an H-ZSM-5 catalyst where at least a portion of the ZSM-5 catalyst ion exchange sites are occupied by H+ ions. Moreover, the MFI zeolite catalyst, for example, the H-ZSM-5 catalyst, may have a Si/Al molar ratio of at least 15. In further embodiments, MFI zeolite catalyst may have a Si/Al molar ratio of at least 20, or at least 35, or at least 45. Additionally, the MFI zeolite catalyst may have an average particle size may vary depending on the application for use. For example, the MFI zeolite catalyst may have an average particle size of 50 to 120 micrometers (μm) when used in a fluid catalyzed application or 1/16" to 1/4" when used in a fixed bed application.

Moreover, the metal oxide precursor is dispersed within the microstructure of the cracking catalyst and calcined in-situ to convert the metal oxide precursor to a metal oxide. Dispersion of the at least one metal oxide precursor within the microstructure of the cracking catalyst provides the metal oxide in close proximity to the endothermic cracking sites of the cracking catalyst, thereby making the heat generating aspect of the heat generating catalyst more effective. Dispersion of the at least one metal oxide precursor within the microstructure of the cracking catalyst is contrasted with mere physical mixing of a cracking catalyst and a metal oxide. Physical mixing only provides the metal oxide to the endothermic cracking sites of the cracking catalyst near the surface of the particles of the cracking catalyst and not near the additional endothermic cracking sites within the microstructure of the cracking catalyst. Dispersion of the metal oxide precursors throughout the microstructure of the cracking catalyst helps avoid temperature gradients in the catalyst bed and hot spots within the catalyst bed which may result from merely physically mixing a cracking catalyst and metal oxides. It will be appreciated that the heat generating catalyst may be provided to a hydrocarbon cracking system with the metal oxide precursor in a reduced form which is subsequently oxidized to a metal oxide by a first passage though a regenerator during operation of the hydrocarbon cracking system.

In various embodiments, the at least one metal oxide precursor is dispersed within the microstructure of the cracking catalyst via at least one of wet impregnation, dry impregnation, incipient wetness impregnation, precipitation, ion exchange, electrolysis deposition, deposition-precipitation, chemical vapor deposition, and flame spray pyrolysis. Each method allows the metal oxide precursor to be dispersed throughout the microstructure of the cracking catalyst which is not possible with mere physical mixing. In various embodiments the metal oxide is dispersed throughout the microstructure of the cracking catalyst. In one or more embodiments, the dispersing of the metal oxide precursor within the microstructure of the cracking catalyst comprises the step of dissolving the metal oxide precursor in an organic solvent, for example methanol, ethanol, acetone or water, and adding drop-wise to the cracking catalyst while stirring the resulting heat generating catalyst. In further embodiments, the method additionally includes drying the cracking catalyst with the metal oxide precursor dispersed within the microstructure of the cracking catalyst. The drying procedure comprises drying at 90° C. to 120° C. for at least 1 hours. Further embodiments, include drying at 90° C. to 120° C. for at least 3 hours, drying at 95° C. to 115° C. for at least 3 hours, and drying at 98° C. to 112° C. for at least 3 hours.

As previously indicated, the cracking catalyst with the metal oxide precursor dispersed within the microstructure of the cracking catalyst is calcined to generate metal oxides in-situ. In one or more embodiments, the calcining of the heat generating catalyst comprising the cracking catalyst with the metal oxide precursor dispersed throughout the microstructure of the cracking catalyst is achieved in air at 400° C. to 800° C. The calcining procedure is extended for sufficient time to convert the metal oxide precursor to a metal oxide in-situ, typically for 3 hours or more. Further embodiments, include calcining at 700° C. to 800° C. for at least 3 hours, calcining at 550° C. to 650° C. for at least 4 hours, and drying at 600° C. to 700° C. for at least 3 hours.

The conversion of the metal oxide precursor to a metal oxide provides sites dispersed throughout the microstructure of the cracking catalyst for heat generation as a result of a reduction reaction of the metal oxide. In at least one particular embodiment, the generated metal oxide is a copper oxide. In various embodiments, the metal oxide is at least one of an oxide of iron, copper, zinc, chromium, molybdenum, vanadium, cerium, manganese, bismuth, silver, cobalt, vanadium, zirconium, tungsten, magnesium, and their combinations.

In at least one embodiment, the metal oxide precursor is a hydrate of a metal salt of nitric acid. Non-limiting examples include, copper nitrate trihydrate ($Cu(NO_3)_2 \cdot 3H_2O$), cobalt(II) nitrate hexahydrate ($Co(NO_3)_2 \cdot 6H_2O$), and chromium (III) nitrate nonahydrate ($Cr(NO_3)_3 \cdot 9H_2O$).

The at least one metal oxide dispersed within the microstructure of the cracking catalyst is chemically bonded to the microstructure. Impregnation or other dispersion techniques pushes the metal oxide precursor inside the microstructure of the cracking catalyst, conversely merely physical mixing keeps the cracking catalyst and metals oxide particles completely separate. Further, impregnation may bind the oxide metals chemically to the functional groups in the catalyst surface and inside pores. Dispersion within the microstructure of the cracking catalyst also places metal oxides close to the active sites in the catalyst, conversely physical mixing keeps the metal oxides and the active sites in the catalyst separated.

In one or more embodiments, the heat generating catalyst further comprises a promoter. Non-limiting examples of promoters include an alkali metal, an alkaline earth metal, a rare earth metal, a transition metal, phosphorous, and their combinations.

The created heat generating catalyst for hydrocarbon cracking may be utilized in a hydrocarbon cracking system in a hydrocarbon oxidative cracking process. The hydrocarbon cracking system of FIG. 1 is a laboratory set-up provided for the present discussion which follows; however, it should be understood that the present systems and methods encompass other configurations including large-scale and industrial process schemes.

Referring to the embodiment of FIG. 1, a laboratory scale hydrocarbon cracking system 100 with at least one catalyst bed reactor 10 for cracking a hydrocarbon feed 4 is shown. Specifically, the hydrocarbon cracking system 100 performs catalytic hydrocarbon cracking of a hydrocarbon feed 4 with the heat generating catalyst discussed previously forming a catalyst bed in the catalyst bed reactor.

The hydrocarbon feed 4 may refer to any hydrocarbon source derived from petroleum, coal liquid, or biomaterials. Example hydrocarbon sources include whole range crude oil, distilled crude oil, residue oil, topped crude oil, liquefied petroleum gas (LPG), naphtha, gas oil, product streams from oil refineries, product streams from steam cracking processes, liquefied coals, liquid products recovered from oil or tar sands, bitumen, oil shale, biomass hydrocarbons, and the like. In specific examples, which will be described in subsequent paragraphs, the hydrocarbon feed 4 may include n-hexane, naphtha, mixed butenes, and ethylene. C4-C5, C9 and C9+ hydrocarbons may be included to re-crack and generate value added components when demand for such components is elevated. The n-hexane is just one example of a long chain hydrocarbon, which is presently defined as hydrocarbon carbon chains having at least six carbons.

Referring again to FIG. 1, the hydrocarbon cracking system 100 may comprise a reactor system having at least one catalyst bed reactor 10, and optionally, additional reactors and units. For example, these additional optional units may include a preheater 12 connected to the at least one catalyst bed reactor 10 and additional heaters or heat exchangers 18.

As shown, the catalyst bed reactor 10 may include a catalyst bed 14 of the heat generating catalyst disposed in the catalyst bed reactor 10. As stated previously, the operation of the catalyst bed reactor 10 results in the cracking of the hydrocarbon feed 4 to produce a cracking product 40, where the cracking product 40 comprises light $C_1$-$C_4$ hydrocarbons, such as ethylene and propylene, and heavy $C_5$+ hydrocarbons. The cracking product 40 may also comprise BTX aromatics (benzene, toluene, and xylene isomers). The ratio of components in the cracking product 40 varies depending on the feed type, reaction parameters, and catalyst parameters. Utilizing the heat generating catalyst as the catalyst bed 14 of the catalyst bed reactor 10 reduces or eliminates the additional heat energy input requirements in the catalyst bed reactor 10. Specifically, the heat generating catalyst undergoes an exothermic reaction in the catalyst bed reactor 10 as the metal oxide is reduced which offsets the endothermic cracking process yielding a thermally neutral overall hydrocarbon cracking operation. Additionally, in one or more embodiments, the reduced metal oxide may be regenerated in an oxidizing atmosphere to generate additional heat release.

Additionally, hydrogen elimination by the metal oxides as a result of their reduction reactions limits hydrogen transfer reactions and as a result promotes hydrocarbon cracking toward light olefins. The removal of the hydrogen from the product stream also eliminates the costly and difficult process of separating the resulting light olefins from hydrogen.

In one or more embodiments, the catalyst bed reactor 10 may be a fixed-bed reactor, a fluidized bed reactor, a slurry reactor, or a moving bed reactor. In a specific embodiment, the catalyst bed reactor 10 is a fixed-bed reactor. In some embodiments with a fixed bed reactor, the residence time of the combined hydrocarbon feed 4 and the heat generating catalyst stream 2 in the catalyst bed reactor 10 is in the range of 0.05 seconds to 1 hour. For example, the residence time may approach 1 hour for diesel hydrotreating a liquid feed and is generally in the range of 0.1 to 5 seconds in an FCC application. As such, in various embodiments, the residence time in the catalyst bed reactor 10 is 0.1 seconds to 5 seconds or 5 minutes to 1 hour. The desired residence time in a fixed bed reactor of the combined hydrocarbon feed 4 for optimal hydrocarbon cracking is dependent on operating temperature and composition of both the heat generating catalyst and the hydrocarbon feed 4. Additionally, in one or more embodiments, the bed voidage, which represents the volume fraction occupied by voids, is between 0.2 and 1.0. In further embodiments, the bed voidage is between 0.3 and 0.8.

Additionally, in one or more embodiments with a fixed bed reactor, the catalyst bed 14 of the heat generating catalyst comprises a layer of heat generating catalyst comprising the cracking catalyst with the metal oxide dispersed within the microstructure disposed before a layer of unmodified cracking catalyst. In further embodiments, the catalyst bed 14 of the heat generating catalyst comprises a layer of heat generating catalyst comprising the cracking catalyst with the metal oxide dispersed within the microstructure disposed after a layer of unmodified cracking catalyst. In additional embodiments, the catalyst bed 14 of the heat generating catalyst may comprise a layer of the heat generating catalyst comprising the cracking catalyst with the metal oxide dispersed within the microstructure disposed between a least two layers of unmodified cracking catalyst.

Additionally, in one or more embodiments with a fluidized bed reactor, the catalyst bed 14 comprises a mixture of heat generating catalyst and the cracking catalyst without metal oxide dispersed within its microstructure.

Moreover, the catalyst bed 14 may be preheated. In one or more embodiments the catalyst bed 14 is heated using steam or hot gases in tubes passing through the catalyst bed reactor 10. In further embodiments the catalyst bed 14 is preheated in a gas flow containing heated nitrogen 6 and oxygen at sufficient flow rate to heat the catalyst bed 14. The preheated gas flow or steam is heated from 450° C. to 650° C., or from 475° C. to 525° C., or from 490° C. to 510° C. in various embodiments.

Referring to FIG. 1, the method further may include preheating the hydrocarbon feed 4 upstream of the catalyst bed reactor 10. This preheating of the hydrocarbon feed 4 may be achieved in a preheater 12. As shown, the hydrocarbon fed 4 may be heated in the presence of nitrogen 6 and air 8. Additionally, the hydrocarbon fed 4 may be heated in the presence of steam, hydrogen, air, oxygen, or their combinations. In one embodiment, the preheater 12 may raise the temperature of the hydrocarbon feed being supplied to the catalyst bed reactor 10 to at least 200° C. Feed preheaters help alleviate cooling of the top of the catalyst bed reactor 10 with a cold feed which in turn would affect catalyst performance.

In one or more embodiments, the hydrocarbon cracking system 100 may also include at least one hydrocarbon preheater 18 disposed upstream of the preheater 12. The hydrocarbon preheater or preheaters 18, as shown in FIG. 1, raises the temperature of the hydrocarbon feed being supplied to the at least one preheater 12. In further embodiments, the hydrocarbon preheater 18 raises the temperature of the hydrocarbon feed being supplied to the at least one preheater 12 to at least 100° C. The hydrocarbon preheaters 18 may include a heat exchanger or a similar heater device familiar to one of ordinary skill in the art.

The hydrocarbon cracking system 100 may also include other heating components as shown. For example, the hydrocarbon cracking system 100 may include a reactor oven 20, or a hot box 22 surrounding the catalyst bed reactor 10, the preheater 12, and the hydrocarbon preheater 18. The reactor oven 20 may help maintain the temperature of the catalyst bed reactor 10 and the preheater 12 in a laboratory scale or pilot unit. Similarly, the hot box 22 serves to retain heat around the catalyst bed reactor 10, the preheater 12, and the hydrocarbon preheater 18 so as to reduce thermal losses.

Referring again to FIG. 1, the cracking product 40 may comprise a variety of light $C_1$-$C_4$ hydrocarbons and heavy $C_{5+}$ hydrocarbons. In one or more embodiments, the cracking product 40 specifically comprises propylene, butenes such as 2-trans-butene, n-butene, iso-butene and 2-cis-butene, $C_5$ olefins, aromatics, methane, ethane, propane, butanes, and pentane. The constituents of the cracking product 40 are dependent upon the components of the hydrocarbon feed 4 and the properties of both the cracking catalyst and the metal oxide.

To separate light hydrocarbons from heavy hydrocarbons in the cracking product 40, the hydrocarbon cracking system 100 may also include at least one liquid/gas separator 24. The liquid/gas separator 24, which may include a flash drum or the like, separates the cracking product 40 into multiple product streams based on the boiling point of individual components of the cracking product 40. Specifically in the liquid/gas separator 24, the light hydrocarbon stream 42 may evaporate out of the top of the liquid/gas separator 24 as gas phase light hydrocarbons, while the liquid phase heavy hydrocarbon stream 44 is discharged from the bottom of the liquid/gas separator 24.

Further reactions are contemplated to separate the desired propylene and ethylene from the light hydrocarbon stream 42. For example, the light hydrocarbon stream 42 may be cooled and collected as a liquid hydrocarbon product. At which point, propylene and ethylene may be separated via a distillation or extraction methodology.

In further embodiments, steam is additionally supplied to the hydrocarbon cracking system 100 to control the space velocity of the reaction. In embodiments, deionized water is passed through an evaporator or superheater to feed stream directly into the catalyst bed reactor 10. Such an arrangement may provide superheated stream up to 400° C. to the catalyst bed reactor 10. The weight hourly space velocity (WHSV) is defined as the weight of entering feed per hour (hr) divided by the weight of the catalyst. In various embodiments, the WHSV of the reaction is 1 to 100 hours$^{-1}$ (hr$^{-1}$), 3 to 9 hr$^{-1}$, 3 to 4 hr$^{-1}$, and 8 to 9 hr$^{-1}$ and varies depending on the type of reaction to be catalyzed.

The limiting factor for reaction time with the heat generating catalyst is the metal oxide loading. Specifically, the heat generated from reduction of the metal oxides subsides prior to deactivation of the cracking catalyst. As such, in at least one embodiment, hydrogen or other flammable species may be selectively burned in a separate reactor to generate additional heat to fuel the endothermic hydrocarbon cracking reaction beyond the period where the reducing metal oxide supplies additional heat to the active sites of the cracking catalyst.

EXAMPLES

The following examples are illustrative of the present embodiments and are not intended to limit the scope of the described embodiments of the disclosure.

Example 1—CuO/H-ZSM-5 Catalyst

Figure 2:
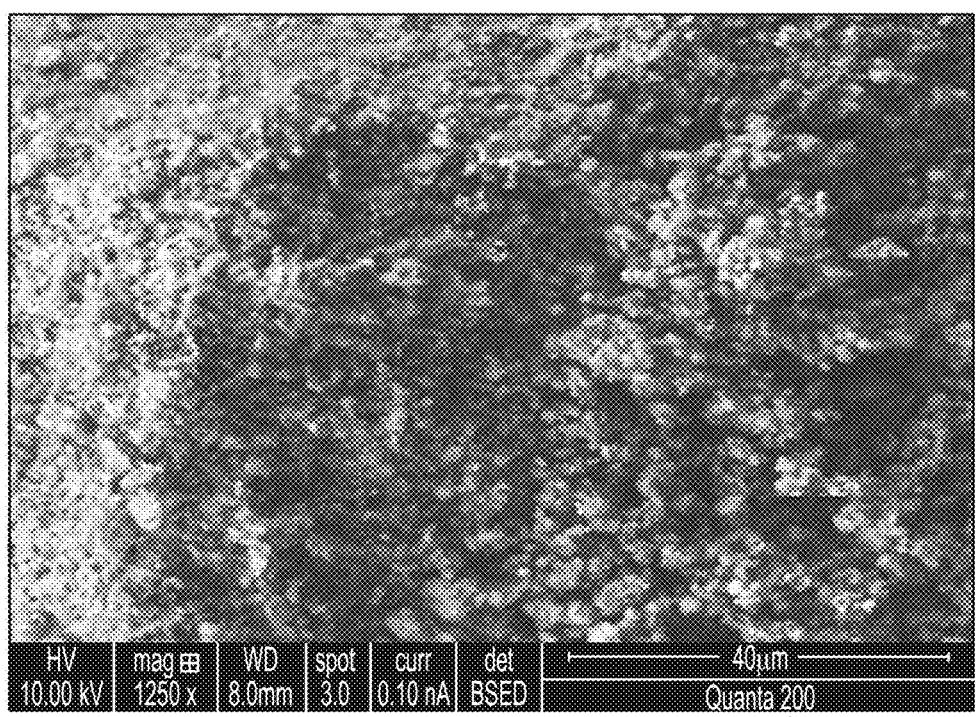
FIG. 2 is a back-scattered electron scanning electron microscopy image of CuO/H-ZSM-5 catalyst in accordance with one or more embodiments of the present disclosure.

H-ZSM-5 catalyst with a Si/Al weight ratio of 38 loaded with approximately 20 wt % copper (II) oxide was prepared. Copper nitrate trihydrate ($Cu(NO_3)_2.3H_2O$) available from Sigma-Aldrich was provided as the metal oxide precursor. 11.4 grams (g) of the copper nitrate trihydrate was dissolved completely in 3.7 g of deionized water. Subsequently, the Copper nitrate trihydrate dissolved in the deionized water was added drop-wise to 15 g of lightly crushed ZSM-5 while stirring. The resulting solid was dried in an oven at 110° C. for 4 hours and then calcined in air at 650° C. for 4 hours. FIG. 2 shows an output image from back-scattered electron scanning electron microscopy (BSE-SEM) of the CuO/H-ZSM-5 catalyst. Additionally, inductively coupled plasma (ICP) analysis confirmed a final 19.9% copper oxide loading on the zeolite catalyst.

Figure 3:
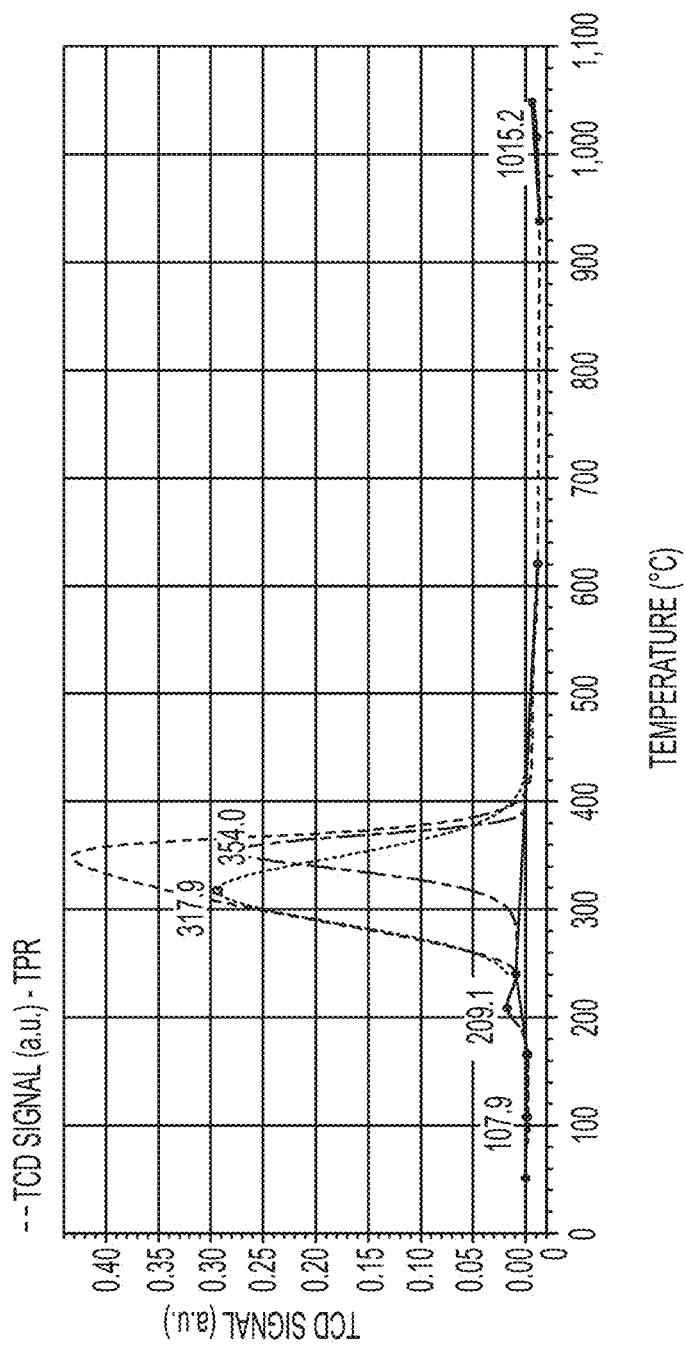
FIG. 3 is temperature programmed reduction test for 20% CuO supported on Alumina.

With reference to FIG. 3, a temperature programmed reduction (TPR) test for 20% CuO supported on alumina is provided. A sample of CuO supported on alumina was prepared for this test to singly determine the reduction behavior of copper. The TPR test confirms that CuO can be reduced and generate heat at reaction temperatures over 350° C.

Example 2—FeO/H-ZSM-5 Catalyst

H-ZSM-5 catalyst with a Si/Al weight ratio of 38 loaded with mixed iron (II & III) oxides was prepared. 15 g of the mixed iron (II & III) oxides were added to 15 g of the H-ZSM-5 and 20 g of α-Alumina as a binder. Subsequently, 30 g of water was added to generate a consistency which allowed easy extrusion through a syringe. The mixture was then extruded and dried overnight at 100° C. After drying, the mixture was calcined under air at 750° C. for 4 hours (hrs).

Example 3—CoO/H-ZSM-5 Catalyst

H-ZSM-5 catalyst with a Si/Al weight ratio of 38 loaded with approximately 20 wt % cobalt oxide was prepared. Cobalt(II) nitrate hexahydrate ($Co(NO_3)_2.6H_2O$) was provided as the metal oxide precursor. 14.6 grams (g) of the cobalt(II) nitrate hexahydrate was dissolved completely in 4.57 g of deionized water. Subsequently, the cobalt(II) nitrate hexahydrate dissolved in the deionized water was added drop-wise to 15 g of lightly crushed ZSM-5 while stirring. The resulting solid was dried in an oven at 110° C. for 4 hours and then calcined in air at 650° C. for 4 hours.

Example 4—CrO/H-ZSM-5 Catalyst

H-ZSM-5 catalyst with a Si/Al weight ratio of 38 loaded with approximately 20 wt % chromium oxide was prepared. Chromium (III) nitrate nonahydrate ($Cr(NO_3)_3.9H_2O$) was provided as the metal oxide precursor. 22.1 grams (g) of the chromium (III) nitrate nonahydrate was dissolved completely in 13.9 g of deionized water. Subsequently, the chromium (III) nitrate nonahydrate dissolved in the deionized water was added drop-wise to 15 g of lightly crushed ZSM-5 while stirring. The resulting solid was dried in an oven at 110° C. for 4 hours and then calcined in air at 650° C. for 4 hours.

The improved conversion of the hydrocarbon feed 4 and light olefin (for example, ethylene and propylene) yields are validated with experimental testing. Experimental data was obtained to demonstrate the effect of modifying the zeolite catalyst with metal oxides. Catalytic reactions were carried out in a fixed-bed flow reactor system and fluidized riser simulator. For the fixed bed experiments, hexane was provided to an experimental set-up of the hydrocarbon cracking system 100 under varying conditions.

Catalyst prepared in accordance with example 1 was loaded into the reactor. For each example, the zeolite catalyst of H-ZSM-5 with a Si/Al weight ratio of 38 was acquired from Nankai University Catalyst Company. The zeolite catalyst contains 30% by weight gamma Alumina as a binder. The unmodified catalyst for comparative unmodified catalyst testing was H-ZSM-5 with a Si/Al ratio of 38 which was crushed and sieved to a particle size in the range of 5 to 850 nanometers (nm) or 250 to 850 nm, or 425 to 850 nm. Additionally N-hexane for the hydrogen feed was acquired from Sigma-Aldrich and was high performance liquid chromatography (HPLC) grade.

The fixed-bed flow reactor system has two tubular reactors connected in series. The catalyst for testing, for example, the CuO/H-ZSM-5 catalyst of example 1, was mounted in the second reactor while the first reactor was utilized to preheat the hexane feed to reaction temperature. Feed preheaters improve energy efficiency of the process. Additionally, if a cold feed is introduced directly into a catalyst bed, the top section of the catalyst bed will cool and reduce performance of the reactor as well as affect conversion and selectivity. The fresh catalyst was first activated at 550° C. under airflow at 0.154 liters/minute (l/min) for 1 hour. At the desired reaction temperature the n-hexane was introduced into the reactor to start the reaction. The reaction was performed at 550° C. and at a WHSV of 3.5 $hr^{-1}$, using nitrogen as a diluent.

Figure 4:
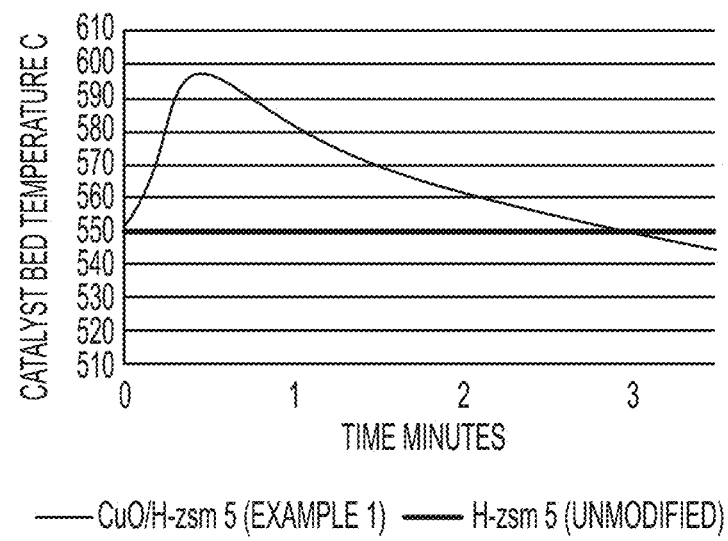
FIG. 4 is a catalyst bed temperature profile for CuO/H-ZSM-5 and unmodified H-ZSM-5 at a weight hourly space velocity of 3.5 $hr^{-1}$ and initial temperature of 550° C.

With reference to FIG. 4, a comparison of the catalyst bed temperature profile as the reaction time progresses is provided. The catalyst bed temperature was measured using a 3 point thermocouple mounted inside the catalyst bed. The reaction was performed at 550° C. and at a WHSV of 3.5 $hr^{-1}$, using nitrogen as a diluent. The catalyst bed temperature for an unmodified H-ZSM-5 catalyst held steady at the reaction temperature of 550° C. Conversely, the modified CuO/H-ZSM-5 catalyst prepared in accordance with example 1 resulted in a distinct exothermic reaction. The catalyst bed temperature quickly rose from the starting reaction temperature of 550° C. to over 597° C. demonstrating the exothermicity of the reaction before decreasing as the reaction progressed. The steady decrease of the catalyst bed temperature after the initial spike is believed to be the result of extinction of oxidized metal species as the oxidized metal species are reduced resulting in a decrease in the generation of additional heat. The modified catalyst resulted in an exothermic reaction which yielded a nearly 50° C. increase in the catalyst bed temperature at the chosen reaction conditions. To eliminate the effect of the controller, the temperature of the oven was set a certain temperature that kept the catalyst bed at 550° C. under the flow of nitrogen. Thus, when the feed was introduced, any temperature increase or decrease could be attributed to the reaction and not the effects of the controller.

Figure 5:
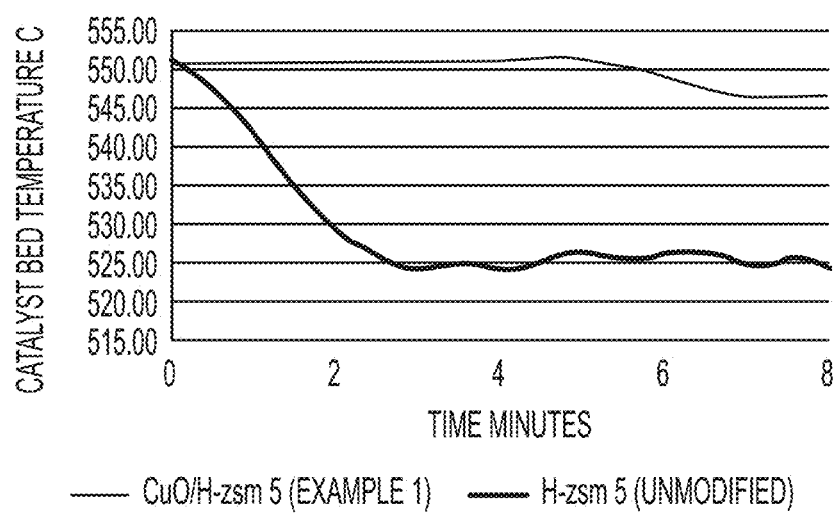
FIG. 5 is a catalyst bed temperature profile for CuO/H-ZSM-5 and unmodified H-ZSM-5 at a weight hourly space velocity of 8.4 $hr^{-1}$ and initial temperature of 550° C.

The demands on the external heating functionality of the fixed-bed reactor system to maintain the catalyst bed temperature during the exothermic cracking reaction increases as the flow rate of hydrocarbon feed increases through the reactor. With reference to FIG. 5, a comparison of the catalyst bed temperature profile as the reaction time progresses is provided. The reaction was performed at 550° C. and at a WHSV of 8.4 hr$^{-1}$, using nitrogen as a diluent. The reaction parameters were that same as with FIG. 4, but the WHSV was changed to 8.4 hr$^{-1}$. With the increased hydrocarbon flow rate through the reactor, the modified CuO/H-ZSM-5 catalyst prepared in accordance with example 1 resulted in the catalyst bed temperature bed holding substantially steady at 550° C. Conversely, the unmodified H-ZSM-5 catalyst resulted in a dip of the catalyst bed temperature down to 525° C. from the initial catalyst bed temperature of 550° C. The modification of space velocity and hydrocarbon to catalyst ratio resulted in a thermoneutral reaction for the modified CuO/H-ZSM-5 catalyst prepared in accordance with example 1.

Figure 6:
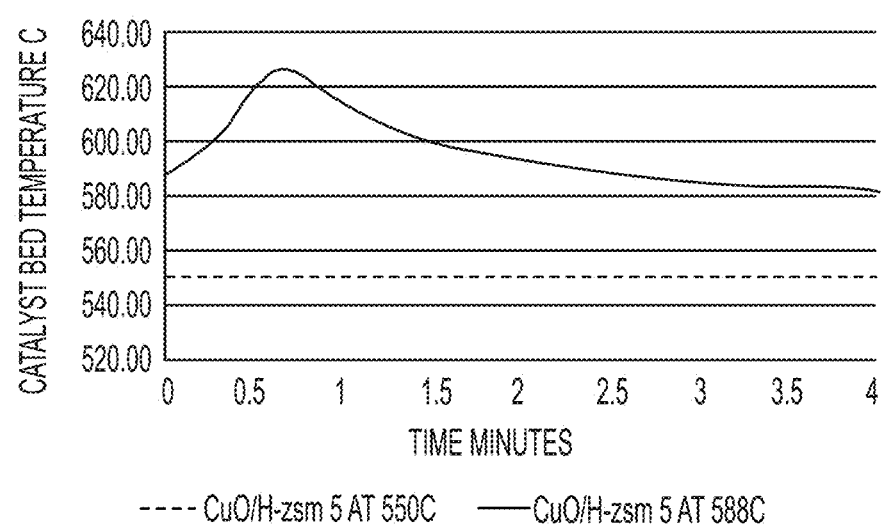
FIG. 6 is a catalyst bed temperature profile for CuO/H-ZSM-5 at a weight hourly space velocity of 8.4 $hr^{-1}$ and initial temperature of 550° C. and CuO/H-ZSM-5 at a weight hourly space velocity of 8.4 $hr^{-1}$ and initial temperature of 588° C.

The initial catalyst bed temperature also effects heat generation from the modified H-ZSM-5 catalyst. With reference to FIG. 6, a comparison of the catalyst bed temperature profile as the reaction time progresses is provided with different initial catalyst bed temperatures. The reaction was performed at 588° C. and at a WHSV of 8.4 hr$^{-1}$, using nitrogen as a diluent. The reaction parameters were that same as with FIG. 5, but the initial catalyst bed temperature was increased from 550° C. to 588° C. With the increased initial catalyst bed temperature, the modified CuO/H-ZSM-5 catalyst prepared in accordance with example 1 generated more heat initially resulting in a spike of the catalyst bed temperature from 588° C. to over 625° C. Conversely, the modified CuO/H-ZSM-5 catalyst reacted with an initial catalyst bed temperature of 550° C. resulted in a steady catalyst bed temperature of 550° C. with no substantial spike. Thus, the heat generated at higher catalyst bed temperatures is more than enough to fuel the desired hydrocarbon cracking process under these reaction conditions. A thermal neutral process can be reached at 550° C. under these reaction conditions and a thermally positive process can be reached at 588° C. under these conditions.

Subsequent experimental data was obtained with catalyst prepared in accordance with examples 1, 3 and 4 as well as unmodified H-ZSM-5 catalyst in a CREC (Chemical Reactor Engineering Centre at University of Western Ontario) riser simulator batch unit. A CREC riser simulator batch unit is a batch reactor that closely reproduces reaction conditions of industrial continuous "riser" and "downer" units allowing cost effective research and development of new catalytic processes. The CREC riser simulator batch unit is commercialized under exclusive license by Reactor Engineering and Catalytic Technologies Inc. (London, Ontario, CANADA). The cracking reactions were performed with a reactor catalyst loading fixed at 0.4 g and a reactant residence time of 5 seconds (s). Additionally, all tests were performed at 550° C. and with a catalyst to oil ratio of 0.7 and residence time of 5 s.

The testing of examples 1, 3 and 4 as well as unmodified H-ZSM-5 catalyst in a CREC riser simulator batch unit under the same process parameters allows for direct comparison of the modifications of examples 1, 3 and 4 with unmodified H-ZSM-5 catalyst. The conversion of the feed hydrocarbon as well as the $C_2$ and $C_3$ yield percentages for each of the samples is provided subsequently in Table 1. As previously indicated, Hexane was the feed hydrocarbon for the experimental set-up. The conversion and yield percentages are based on weight percentages. Specifically, Hexane conversion is provided as formula [1] and yield of the individual products is provided as formula [2].

$$\text{Hexane Conversion} = \frac{\left(\begin{array}{c}\text{Mass of hexane fed} - \\ \text{Mass of hexane in products}\end{array}\right)}{\text{Mass of hexane fed}} \times 100 \quad \text{Formula [1]}$$

$$\text{Yield of product } i = \frac{(\text{Mass of } i)}{\text{Mass of hexane fed}} \times 100 \quad \text{Formula [2]}$$

TABLE 1

| Catalyst | Conversion | $C_2$ Yield % | $C_3$ Yield % |
|---|---|---|---|
| Unmodified H-ZSM-5 | 44 | 5.4 | 7.5 |
| Example 1 CuO/H-ZSM-5 | 40 | 15 | 16.1 |
| Example 3 CoO/H-ZSM-5 | 40 | 9.4 | 14.3 |
| Example 4 CrO/H-ZSM-5 | 41 | 6.3 | 10 |

The results of the testing of examples 1, 3 and 4 as well as unmodified H-ZSM-5 catalyst in a CREC riser simulator batch unit provided in Table 1 demonstrate an increase in lighter olefin yield such as ethylene and propylene with modification of the H-ZSM-5 catalyst. Additionally, even with 20% metal oxide loading, as with examples 1, 3, and 4, the compromise in overall conversion of the hydrocarbon feed is not significant. The copper modified catalyst of example 1 revealed the highest olefin yield enhancement followed by cobalt and chromium.

It should now be understood that the various aspects of the methods of making a heat generating catalyst for hydrocarbon cracking are described and such aspects may be utilized in conjunction with various other aspects.

In a first aspect, the disclosure provides a method of making a heat generating catalyst for hydrocarbon cracking. The method comprises providing at least one mordenite framework-inverted (MFI) zeolite catalyst having a Si/Al molar ratio of 15 or greater, providing at least one metal oxide precursor; dispersing the at least one metal oxide precursor within a microstructure of the MFI zeolite catalyst, and calcining the heat generating catalyst with the at least one metal oxide precursor dispersed within the microstructure of the MFI zeolite catalyst to form at least one metal oxide in situ. Further, the ratio of the MFI zeolite catalyst to the metal oxide is in the range of 50:50 to 95:5 on a weight basis.

In a second aspect, the disclosure provides the method of the first aspect, in which the at least one metal oxide precursor is dispersed within the microstructure of the MFI zeolite catalyst via at least one of wet impregnation, precipitation, electrolysis deposition, deposition-precipitation, chemical vapor deposition, and flame spray pyrolysis.

In a third aspect, the disclosure provides the method of the first or second aspects, in which the at least one metal oxide is at least one of an oxide of iron, copper, zinc, chromium, molybdenum, vanadium, cerium, manganese, bismuth, silver, cobalt, vanadium, zirconium, tungsten, magnesium, and their combinations.

In a fourth aspect, the disclosure provides the method of the third aspect, in which the at least one metal oxide comprises copper oxide.

In a fifth aspect, the disclosure provides the method of any of the first through fourth aspects, in which the metal oxide precursor is a hydrate of a metal salt of nitric acid.

In a sixth aspect, the disclosure provides the method of any of the first through fifth aspects, in which the metal oxide precursor is copper nitrate trihydrate ($Cu(NO_3)_2 \cdot 3H_2O$), cobalt (II) nitrate hexahydrate ($Co(NO_3)_2 \cdot 6H_2O$), or chromium (III) nitrate nonahydrate ($Cr(NO_3)_3 \cdot 9H_2O$).

In a seventh aspect, the disclosure provides the method of any of the first through sixth aspects, in which dispersing the metal oxide precursor within the microstructure of the MFI zeolite catalyst comprises dissolving the metal oxide precursor in water and adding drop-wise to the MFI zeolite.

In an eighth aspect, the disclosure provides the method of any of the first through seventh aspects, in which the at least one metal oxide is chemically bonded to the microstructure of the MFI zeolite catalyst.

In a ninth aspect, the disclosure provides the method of the seventh aspect, in which the MFI zeolite catalyst is crushed ZSM-5 catalyst having an average particle size of 5 to 850 nanometers.

In a tenth aspect, the disclosure provides the method of the ninth aspect, in which the ZSM-5 catalyst is an H-ZSM-5 catalyst.

In an eleventh aspect, the disclosure provides the method of any of the first through tenth aspects, in which calcining the heat generating catalyst is done in air at 400° C. to 800° C. for sufficient time to convert the metal oxide precursor to a metal oxide in situ.

In a twelfth aspect, the disclosure provides the method of any of the first through eleventh aspects, in which the heat generating catalyst further comprises a promoter.

In a thirteenth aspect, the disclosure provides the method of the twelfth aspect, in which the promoter is at least one of an alkali metal, an alkaline earth metal, a rare earth metal, a transition metal, phosphorous, and their combinations.

In a fourteenth aspect, the disclosure provides a method of using a heat generating catalyst in a hydrocarbon cracking process. The method comprises providing a catalyst bed reactor, introducing a hydrocarbon feed to the catalyst bed reactor, and cracking the hydrocarbon feed to produce a cracking product. The catalyst bed reactor includes a catalyst bed of the heat generating catalyst disposed in the catalyst bed reactor. The heat generating catalyst comprises at least one mordenite framework-inverted (MFI) zeolite catalyst having a Si/Al molar ratio of 15 or greater, and at least one metal oxide dispersed within a microstructure of the MFI zeolite catalyst.

In a fifteenth aspect, the disclosure provides the method of the fourteenth aspect, in which the catalyst bed reactor comprises a fluidized bed reactor or a fixed-bed reactor.

In a sixteenth aspect, the disclosure provides the method of any of the fourteenth through fifteenth aspects, in which the catalyst bed reactor is a fixed-bed reactor and the catalyst bed of the heat generating catalyst comprises a layer of the heat generating catalyst disposed before a layer of MFI zeolite catalyst, a layer of heat generating catalyst disposed after a layer of MFI zeolite catalyst, or at least one layer of heat generating catalyst disposed between at least two layers of MFI zeolite catalyst.

In a seventeenth aspect, the disclosure provides the method of any of the fourteenth through sixteenth aspects, in which the at least one metal oxide is chemically bonded to the microstructure of the MFI zeolite catalyst.

In an eighteenth aspect, the disclosure provides the method of any of the fourteenth through seventeenth aspects, in which the heat generating catalyst further comprises a promoter.

In a nineteenth aspect, the disclosure provides the method of any of the fourteenth through eighteenth aspects, in which the promoter is at least one of an alkali metal, an alkaline earth metal, a rare earth metal, a transition metal, phosphorous, and their combinations.

In a twentieth aspect, the disclosure provides the method of any of the fourteenth through nineteenth aspects, in which the MFI zeolite catalyst is a ZSM-5 catalyst.

In a twenty-first aspect, the disclosure provides the method of the twentieth aspect, in which the ZSM-5 catalyst is a H-ZSM-5 catalyst.

It should be apparent to those skilled in the art that various modifications and variations can be made to the embodiments described here without departing from the spirit and scope of the claimed subject matter. Thus it is intended that the specification cover the modifications and variations of the various embodiments described here provided such modification and variations come within the scope of the appended claims and their equivalents.

Throughout this disclosure ranges are provided. It is envisioned that each discrete value encompassed by the ranges are also included. Additionally, the ranges which may be formed by each discrete value encompassed by the explicitly disclosed ranges are equally envisioned.

What is claimed is:

1. A method of making a heat generating catalyst for hydrocarbon cracking, the method comprising:
    providing at least one mordenite framework-inverted (MFI) zeolite catalyst having a Si/Al molar ratio of 15 or greater;
    providing at least one metal oxide precursor, where the metal oxide precursor is a hydrate of a metal salt of nitric acid;
    dispersing the at least one metal oxide precursor within a microstructure of the MFI zeolite catalyst, where dispersing the metal oxide precursor within the microstructure of the MFI zeolite catalyst comprises dissolving the metal oxide precursor in water to generate an acidic mixture and adding the acidic mixture drop-wise to the MFI zeolite; and
    calcining the heat generating catalyst with the at least one metal oxide precursor dispersed within the microstructure of the MFI zeolite catalyst to form at least one metal oxide in situ,
    where the ratio of the MFI zeolite catalyst to the metal oxide is in the range of 70:30 to 85:15 on a weight basis.

2. The method of claim 1 where the at least one metal oxide precursor is dispersed within the microstructure of the MFI zeolite catalyst via at least one of wet impregnation, precipitation, electrolysis deposition, deposition-precipitation, chemical vapor deposition, and flame spray pyrolysis.

3. The method of claim 1 where the at least one metal oxide is at least one of an oxide of iron, copper, zinc, chromium, molybdenum, vanadium, cerium, manganese, bismuth, silver, cobalt, zirconium, tungsten, magnesium, and their combinations.

4. The method of claim 3 where the at least one metal oxide comprises copper oxide.

5. The method of claim 1 where the metal oxide precursor is copper nitrate trihydrate ($Cu(NO_3)_2 \cdot 3H_2O$), cobalt (II) nitrate hexahydrate ($Co(NO_3)_2 \cdot 6H_2O$), or chromium (III) nitrate nonahydrate ($Cr(NO_3)_3 \cdot 9H_2O$).

6. The method of claim 1 where the at least one metal oxide is chemically bonded to the microstructure of the MFI zeolite catalyst.

7. The method of claim 1 where the MFI zeolite catalyst is crushed ZSM-5 catalyst having an average particle size of 5 to 850 nanometers.

8. The method of claim 7 where the ZSM-5 catalyst is an H-ZSM-5 catalyst.

9. The method of claim 1 where calcining the heat generating catalyst is done in air at 400° C. to 800° C. for sufficient time to convert the metal oxide precursor to a metal oxide in situ.

10. The method of claim 1 where the heat generating catalyst further comprises a promoter.

11. The method of claim 10 where the promoter is at least one of an alkali metal, an alkaline earth metal, a rare earth metal, a transition metal, phosphorous, and their combinations.

\* \* \* \* \*